(12) United States Patent
Fort

(10) Patent No.: US 9,787,171 B2
(45) Date of Patent: Oct. 10, 2017

(54) REGULATOR FOR INTEGRATED CIRCUIT

(71) Applicant: STMicroelectronics (Rousset) SAS, Rousset (FR)

(72) Inventor: Jimmy Fort, Puyloubier (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 675 days.

(21) Appl. No.: 14/315,989

(22) Filed: Jun. 26, 2014

(65) Prior Publication Data
US 2015/0001938 A1    Jan. 1, 2015

(30) Foreign Application Priority Data
Jun. 26, 2013 (FR) ...................... 13 56123

(51) Int. Cl.
*H02M 1/08* (2006.01)
*G06F 21/55* (2013.01)

(52) U.S. Cl.
CPC ............ *H02M 1/08* (2013.01); *G06F 21/558* (2013.01); *Y10T 307/549* (2015.04)

(58) Field of Classification Search
CPC ..... G06F 21/558; H02M 1/08; Y10T 307/549
USPC .......................................................... 307/52
See application file for complete search history.

(56) References Cited

U.S. PATENT DOCUMENTS

| | | | | |
|---|---|---|---|---|
| 5,953,379 A * | 9/1999 | Myers | ................. | H03C 3/0908 327/553 |
| 7,372,965 B1 * | 5/2008 | Wuidart | ................. | G06F 21/558 380/200 |
| 8,334,705 B1 | 12/2012 | Gunnam et al. | | |
| 2003/0222504 A1 * | 12/2003 | Priest | ........................ | H02J 1/10 307/52 |
| 2004/0113696 A1 * | 6/2004 | Forejt | ...................... | H03F 1/086 330/292 |
| 2005/0030096 A1 * | 2/2005 | Suzuki | .................... | H03F 1/302 330/254 |
| 2005/0240782 A1 * | 10/2005 | Hubert | .................. | G06F 21/558 713/300 |
| 2006/0132107 A1 * | 6/2006 | Sicard | ..................... | G05F 1/575 323/280 |
| 2008/0238327 A1 * | 10/2008 | Cho | ...................... | G09G 3/3241 315/169.3 |
| 2009/0009147 A1 * | 1/2009 | Jian | .......................... | G05F 1/575 323/280 |
| 2010/0007408 A1 * | 1/2010 | Yamahira | ............... | G11C 5/143 327/541 |

(Continued)

OTHER PUBLICATIONS

Mesquita, D. et al., "Current Mask Generation: A Transistor Level Security Against DPA Attacks," IEEE 18th Symposium on Integrated Circuits and Systems Design, pp. 115-120, Sep. 4-7, 2005.

*Primary Examiner* — Thienvu Tran
*Assistant Examiner* — Brian K Baxter
(74) *Attorney, Agent, or Firm* — Seed IP Law Group LLP

(57) ABSTRACT

An electronic circuit includes a functional circuit in series with at least one first current source between two terminals of application of a power supply voltage. The first current source is controllable between an operating mode where it delivers a fixed current, independent from the power consumption of said functional circuit, and an operating mode where it delivers a variable current, depending on the power consumption of the functional circuit.

17 Claims, 2 Drawing Sheets

(56) References Cited

U.S. PATENT DOCUMENTS

| | | | |
|---|---|---|---|
| 2011/0187344 A1* | 8/2011 | Iacob | G05F 3/16 323/315 |
| 2011/0193540 A1* | 8/2011 | Dasgupta | H02M 1/15 323/282 |
| 2012/0049936 A1* | 3/2012 | Adkins | H02M 3/07 327/536 |

* cited by examiner

US 9,787,171 B2

REGULATOR FOR INTEGRATED CIRCUIT

BACKGROUND

Technical Field

The present disclosure generally relates to electronic circuits and, more specifically, to the power supply of such circuits. It more specifically applies to a regulator, integrated with the functional circuital block that it powers.

Description of the Related Art

Certain integrated circuits or integrated circuit functional blocks manipulate quantities (generally digital data) which are desired to be made inaccessible from the outside of the circuit, or accessible with a controlled access. Such is for example the case of secret keys in cryptographic applications. The current signature of integrated circuits is however capable of providing information to an external observer (a hacker) carrying out so-called side channel attacks.

BRIEF SUMMARY

One embodiment provides a solution masking the current signature of an integrated circuit or of a portion of such a circuit.

One embodiment provides a solution which remains compatible with different operating modes of the integrated circuit and, more specifically, compatible with a nominal operating mode, a stand-by operating mode, or a test operating mode.

Thus, an embodiment provides an electronic circuit comprising a functional circuit in series with at least one first current source between two terminals of application of a power supply voltage, wherein said first current source is controllable between an operating mode where it delivers a fixed current, independent from the power consumption of said functional circuit, and an operating mode where it delivers a variable current depending of the power consumption of said functional circuit.

According to an embodiment, said first current course is in series with a second current source of variable value, said second source being in parallel on said functional circuit and being active in the first operating mode.

According to an embodiment, the second current source is controlled by a differential amplifier measuring the level of the power supply voltage of said functional circuit.

According to an embodiment, said first current source comprises a current mirror assembly of first transistors on a branch integrating a switch for selecting the operating mode.

According to an embodiment, a transistor controlled by said amplifier grounds the gates of the first transistors.

The foregoing and other features and advantages will be discussed in detail in the following non-limiting description of specific embodiments in connection with the accompanying drawings.

DETAILED DESCRIPTION

Figure 1:
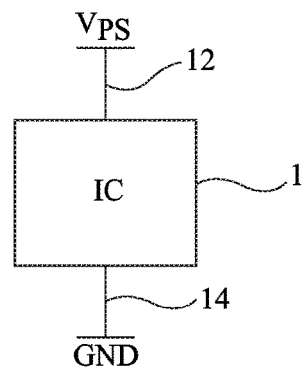
FIG. 1 shows an embodiment of an electronic circuit.

The same elements have been designated with the same reference numerals in the different drawings. For clarity, only those steps and elements which are useful to the understanding of the embodiments which will be described have been detailed. In particular, the function implemented by the integrated circuit(s) or circuit portion(s) powered by means of the regulator to be described has not been detailed, the described embodiments being compatible with usual functions of such functional blocks.

FIG. 1 very schematically shows an electronic circuit 1 (IC) of the type to which the present disclosure applies.

Such a circuit is intended to be supplied with a D.C. voltage $V_{PS}$ applied between terminals 12 (voltage $V_{PS}$) and 14 (ground GND).

The embodiments will be described hereafter in relation with this example of supply with a positive D.C. voltage. Such embodiments however transpose to other forms of D.C. power supply, for example, a negative power supply or a power supply between positive and negative potentials.

In applications where all or part of circuit 1 manipulates data, the access to which is desired to be protected from the outside (secret quantity, cryptography algorithms, etc.), it is desirable to avoid for the current signature of circuit 1, that is, the current variation sampled by this circuit from the power supply source, to enable to detect the protected data. Indeed, the integrated circuit power consumption, and thus the amount of current sampled from the power supply, depends on the task executed by the circuit and on the states of the manipulated data. This type of side-channel attack is known as static power analysis (SPA) or differential power analysis (DPA).

Figure 2:
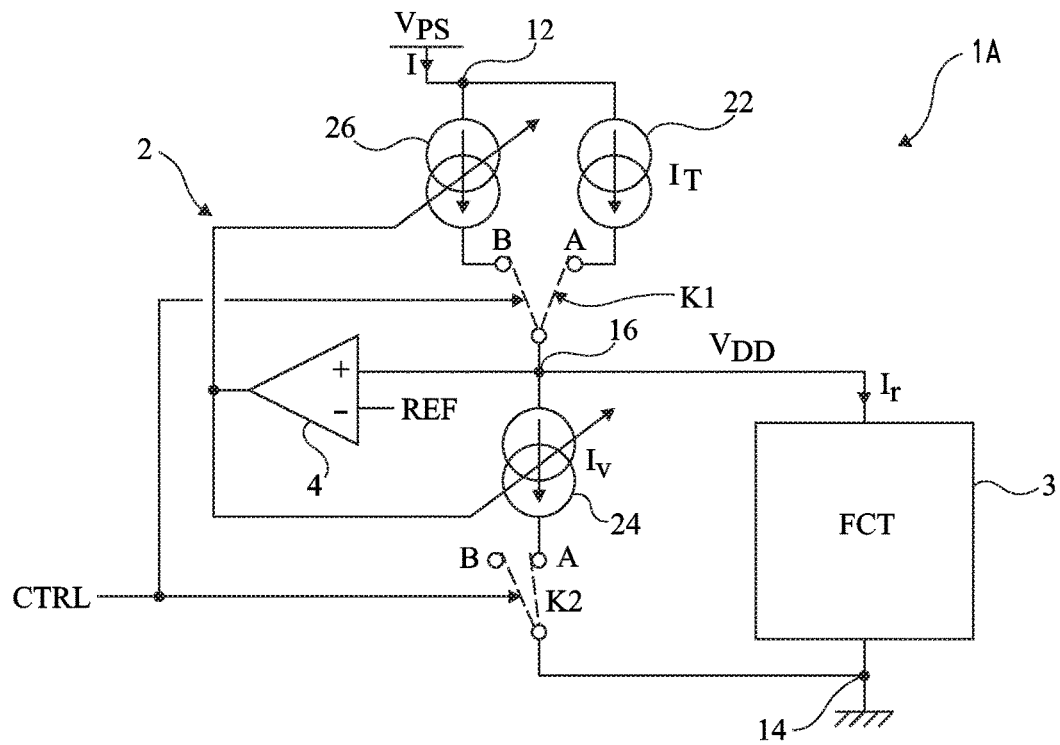
FIG. 2 shows an embodiment of a power supply regulator, integrated with a functional circuital block in an electronic circuit.

FIG. 2 is a simplified representation of an integrated circuit 1A equipped with a regulator 2. This regulator is intended to power the operational function circuits (FCT) 3 of circuit 1A.

In the following description, regulator 2 is assumed to power the entirety of circuit 1A, that is, that the circuit only integrates functional circuit 3 and regulator 2. However, the embodiments which will be described more generally apply to the power supply, by a regulator 2, of all or part of an integrated circuit, the concerned portion(s) preferably corresponding to the portions having a power consumption which is desired to be masked.

To mask the power consumption of functional circuit 3, it is provided to set to a constant average value $I_T$ the current sampled from the power supply. A source 22 of a current, for example, but not necessarily, constant, is thus provided between terminal 12 and a terminal 16 for powering block 3. In order for current $I_T$ to be constant independently from a current $I_r$ really consumed by block 3, a variable current source 24 is provided in parallel on block 3. The function of current source 24 is to consume a current $I_v$ such that the sum of currents $I_r$ and $I_v$ is constant in average and equal to $I_T$.

For example, current source 22 is sized according to the maximum possible power consumption of functional circuit 3 so that, whatever this power consumption, current I sampled from the power supply 2 is constant in average.

The power supply 2 includes a differential amplifier 4 having first and second inputs that respectively receive a reference level REF and a voltage $V_{DD}$ that powers the functional circuit 3. Variable current source 24 is controlled by a differential output of the differential amplifier 4 of level $V_{DD}$. Thus, amplifier 4 regulates the value of current $I_v$ according to the power consumption of block 3. When the power consumption of block 3 increases, the level of voltage $V_{DD}$ tends to decrease since the total current sampled by branches 24 and 3 is set by value $I_T$. Amplifier 4 then controls source 24 to decrease current $I_v$ that it samples and thus restore the level of voltage $V_{DD}$. In the opposite case where the power consumption of block 3 decreases, amplifier 4 causes an increase of current $I_v$ sampled by source 24.

The inventors have however observed that there are integrated circuit operating situations where it is not desirable to implement the functionality of current sources 22 and 24, whether it generates too high a power consumption, or whether it is precisely desired to visualize the current power consumption, for example, in a test situation.

To allow an operation where current I is not maintained constant, it is functionally provided to deactivate current sources 22 and 24. This function is symbolized by two switches K1 and K2 respectively interposed in series with source 22, between terminals 12 and 16, and with source 24, between terminals 16 and 14. Switches K1 and K2 are controlled from a same signal CTRL. In a first position (called A in FIG. 2), switches K1 and K2 connect sources 22 and 24 to the circuit and the above-described operation is then obtained. In a second position (called B in FIG. 2), switch K2 is open, thus deactivating current source 24 and switch K1 connects, instead of source 22, a variable current source 26 between terminals 12 and 16. The variable current source is controlled by amplifier 4 to preserve a functional circuit of regulation of level $V_{DD}$ required by the operation of circuit 3. Thus, when circuit 3 tends to draw more current (current $I_r$ increases), amplifier 4 causes an increase of the current provided by source 26 to maintain voltage level $V_{DD}$. Conversely, when the power consumption of circuit 3 decreases, comparator 4 causes a decrease of the current in source 26, here again to maintain the desired voltage level $V_{DD}$.

Figure 3:
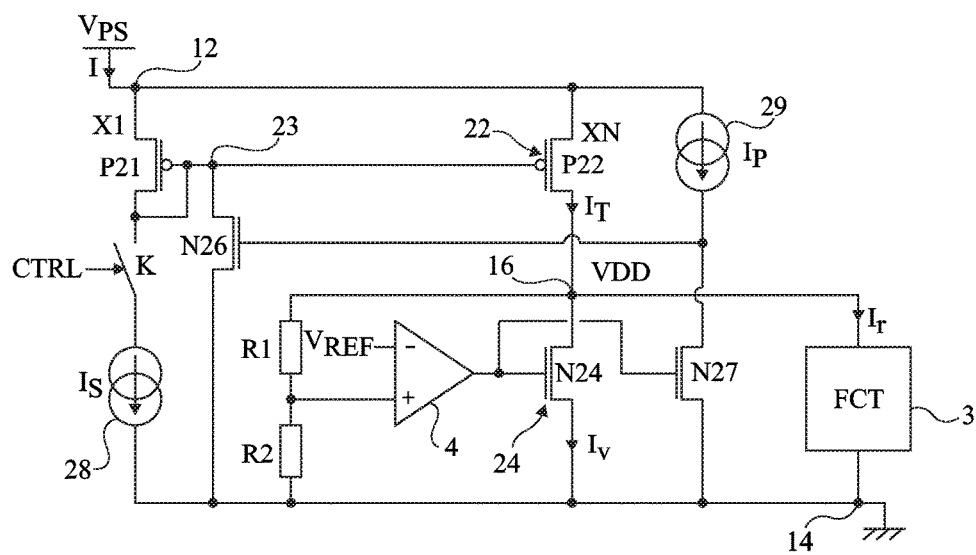
FIG. 3 shows a more detailed diagram of an embodiment of the power supply regulator.

FIG. 3 shows a more detailed electric diagram of an embodiment of circuit 1A of FIG. 2.

Differential amplifier 4 receives a reference voltage $V_{REF}$ (for example, a so-called bandgap voltage) as well as data relative to the value of voltage $V_{DD}$ at node 16 (typically via two resistors R1 and R2 in series between terminal 16 and ground 14). Amplifier 4 controls current source 24, here formed of an N-channel MOS transistor N24 connected between terminal 16 and ground 14. Current source 22 is formed of a P-channel MOS transistor P22, connected between terminals 12 and 16 and assembled as a current mirror having a branch comprising, in series between terminals 12 and 14, a P-channel MOS transistor P21, a switch K playing the role of switches K1 and K2 of FIG. 2, and a source 28 of current $I_s$. A surface area ratio N between transistors P21 and P22 sets the value of current $I_T$ with respect to current $I_s$.

Current source 26 is formed of an N-channel MOS transistor N26 connecting node 23 of interconnection of the gates of transistors P21 and P22 to ground 14. The gate of transistor N26 is connected to the junction point of a source 29 of a bias current $I_P$ and of an N-channel MOS transistor N27 between terminals 12 and 14, the gate of transistor N27 being connected to the output of amplifier 4. Bias current source 29 and transistor N27 operate as an inverter amplifier (common source) for the output of amplifier 4 with respect to transistor N26.

When switch K is closed, the circuit operates as described hereabove in a mode where the total value I of the current sampled from the power supply source at level $I_T$ is maintained (neglecting the power consumption in the branch of transistor P21). Current source 29 may be turned off in this operating mode, the gate of transistor N26 then being grounded.

When switch K is open, transistor N26 behaves as the source of current $I_s$ to set (taking into account the surface area ratio between transistors P21 and P22) the current in transistor P22 to make it approximately equal to current $I_r$ consumed by functional circuit 3, and thus regulate the level of voltage $V_{DD}$ independently from the power consumption of functional circuit 3.

Figure 4A:
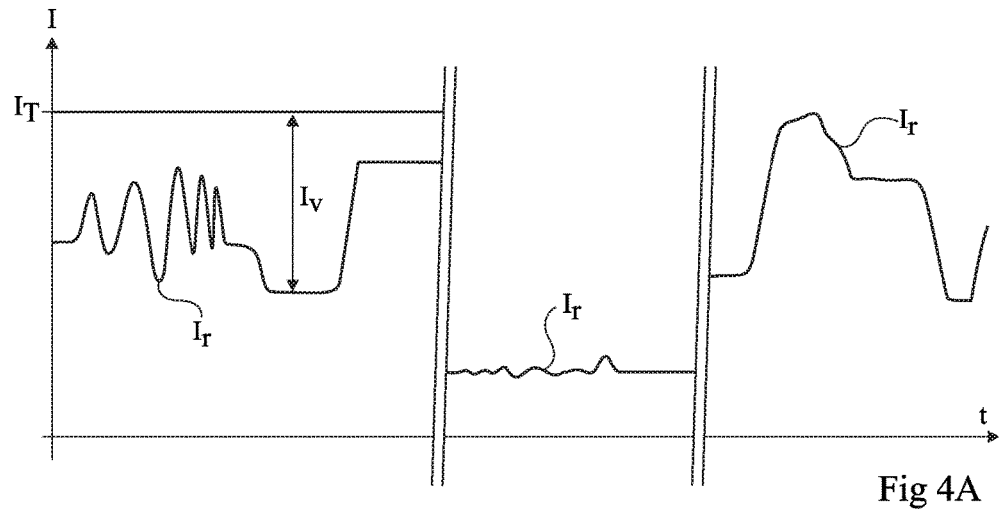
FIGS. 4A and 4B are timing diagrams illustrating the operation of the regulator of FIGS. 2 and 3.
Figure 4B:
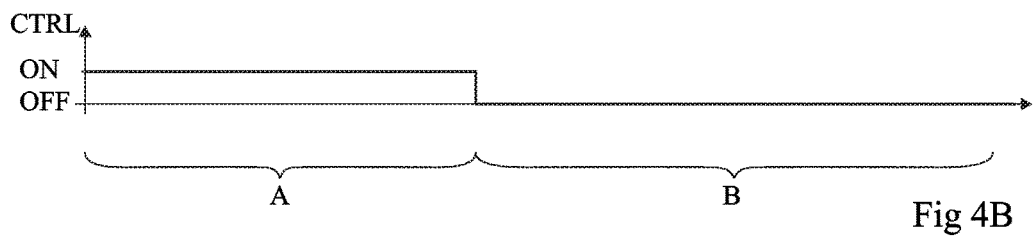

FIGS. 4A and 4B illustrate, in timing diagrams, the operation of the regulator of FIGS. 2 and 3. FIG. 4A illustrates an example of variation of current I sampled from the power supply. FIG. 4B illustrates an example of states ON or OFF of signal CTRL, state ON corresponding to a position where switch K is closed.

In the left-hand portion of the timing diagrams, a situation A corresponding to a masking of the current consumption of the circuit is assumed. In this case, current $I_r$ really consumed by functional circuit 3 is completed by current $I_v$ consumed by current source 24 so that the total current I sampled from the power supply corresponds to value $I_T$. In such a situation, a possible attacker cannot extract data relative to the operations performed by functional circuit 3 from an analysis of the circuit power consumption.

The central and right-hand portions of FIGS. 4A and 4B illustrate two examples of situation where switch K is open (state OFF). In the central portion, a stand-by operating mode of functional circuit 3, where its power consumption need not be masked and where it is however desired to decrease the general circuit power consumption, is assumed. In such a case, current I corresponds to current $I_r$ really consumed. However, as shown in FIG. 4A, the power consumption is decreased with respect to an operation where the current consumption is masked.

In the right-hand portion of FIGS. 4A and 4B, an operation of the circuit in test mode is assumed where, to be able to verify the operation, it is desired to be able to measure the power consumption of functional circuit 3, which should thus not be masked. In such a situation, the power consumption may remain high and reach value $I_T$. However, it is not masked.

When switch K is open, the operation is the following. If current $I_r$ tends to increase by a power consumption inflow in block 3, voltage $V_{DD}$ tends to decrease so that the level on the non-inverting terminal of amplifier 4 also tends to decrease. The output voltage of this amplifier also decreases. Due to the inversion function ensured by transistor N27, the gate voltage level of transistor N26 increases. This results in an increase of the current sampled by transistor N26, which results in a decrease of the gate voltage on node 23 and, accordingly, in an increase of the current in transistor P22, which allows an increase of the level of voltage $V_{DD}$, thus regulating this level. In the case where the power consumption by block 3 decreases, the reverse operation occurs.

In a practical implementation, it will of course be ascertained to provide capacitive compensation elements, in particular between amplifier 4 and the gate of transistor N26, for the stability of the assembly.

An advantage of the described embodiment is that it is now possible to choose between a masking of the power consumption of an integrated circuit to accordingly protect manipulations of information that it contains and a low-power consumption operation (stand-by mode or test mode). As a variation, this function may be used to control, at will, the implementation or not of the masking, for example, when circuit 1A performs a critical operation in terms of information security.

Another advantage is that its forming is particularly simple, the cost in terms of number of transistors to ensure the two functions being low.

Various embodiments have been described. Various alterations, modifications, and improvements will occur to those skilled in the art. In particular, the selection of the values to be given to the different currents of the different fixed current sources is to be made according to the application, and especially to the expected power consumptions. Further, the practical implementation of the described embodiments is within the abilities of those skilled in the art based on the functional indications given hereinabove.

Such alterations, modifications, and improvements are intended to be part of this disclosure. Accordingly, the foregoing description is by way of example only and is not intended to be limiting.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An electronic circuit comprising:
   a functional circuit;
   first and second power supply terminals configured to provide a power supply voltage;
   a first current source coupled with the functional circuit between the first and second power supply terminals, wherein said first current source is configured to deliver a fixed current, independent from a power consumption of said functional circuit, in a first operating mode; and is configured to deliver a variable current, depending on the power consumption of said functional circuit, in a second operating mode;
   a second current source having a variable value, said second current source being in parallel with said functional circuit and coupled to the first current source; and
   a differential amplifier configured to measure a power supply voltage of said functional circuit, control the second current source in the first operating mode based on the power supply voltage of said functional circuit, and control the first current source in the second operating mode based on the power supply voltage of the functional circuit.

2. The electronic circuit of claim 1, wherein said second current source is configured to be active in the first operating mode.

3. The electronic circuit of claim 1, wherein said first current source comprises:
   a current mirror assembly that includes first and second transistors; and a switch coupled to one of the first and second transistors and configured to select between the first and second operating modes.

4. The electronic circuit of claim 3, wherein the first current source includes a third transistor configured to be controlled by said differential amplifier and ground respective control terminals of the first and second transistors.

5. The electronic circuit of claim 4, further comprising a third current source and a fourth transistor coupled between the first and second power supply terminals and coupled to each other at an interconnection node that is coupled to a control terminal of the third transistor, the fourth transistor having a control terminal coupled to an output of the differential amplifier, and the fourth transistor being configured to control the third transistor based on a control signal from the differential amplifier.

6. The electronic circuit of claim 3, wherein said second current source comprises:
   a third transistor coupled with the first transistor and the second power supply terminal, having a control terminal coupled to an output of the differential amplifier, and being coupled to the first transistor at an interconnection node that is configured to provide the power supply voltage.

7. The electronic circuit of claim 1 wherein the differential amplifier is configured increase a current consumed by the second current source in response to the power consumption of the functional circuit decreasing.

8. The electronic circuit of claim 1 wherein the differential amplifier is configured decrease a current consumed by the second current source in response to the power consumption of the functional circuit increasing.

9. A method, comprising:
   delivering, by a first current source, a fixed current that is independent from a power consumption of said functional circuit, to a functional circuit in a first operating mode, delivering the fixed current including:
      measuring, by a differential amplifier, a first power supply voltage of said functional circuit; and
      controlling, by the differential amplifier, a second current source based on the first power supply voltage, said second current source being in parallel with said functional circuit and coupled to the first current source; and
   delivering, by the first current source, a variable current that depends on the power consumption of said functional circuit, to the functional circuit in a second operating mode, delivering the variable current including:
      measuring, by the differential amplifier, a second power supply voltage of said functional circuit; and
      controlling, by the differential amplifier, the first current source based on the second power supply voltage.

10. The method of claim 9, wherein the first current source comprises:
    a current mirror assembly that includes first and second transistors; and
    a switch coupled to one of the first and second transistors, wherein the switch selects between the first and second operating modes.

11. The method of claim 9, wherein delivering the fixed current includes increasing, by the differential amplifier, a current consumed by the second current source in response to the power consumption of the functional circuit decreasing.

12. The method of claim 9, wherein delivering the fixed current includes decreasing, by the differential amplifier, the current consumed by the second current source in response to the power consumption of the functional circuit increasing.

13. An electronic circuit comprising:
    a functional circuit;
    first and second power supply terminals configured to provide a power supply voltage;

a first current source coupled with the functional circuit between the first and second power supply terminals, the first current source configured to deliver a fixed current, independent from a power consumption of the functional circuit, in a first operating mode, the first current source configured to deliver a variable current, depending on the power consumption of the functional circuit, in a second operating mode, the first current source including:
  a current mirror assembly that includes first and second transistors; and
  a third transistor configured to ground respective control terminals of the first and second transistors;
a differential amplifier configured to measure a power supply voltage of the functional circuit, and control the first current source in the second operating mode based on the measured power supply voltage of the functional circuit; and
a second current source and a fourth transistor coupled between the first and second power supply terminals and coupled to each other at an interconnection node that is coupled to a control terminal of the third transistor, the fourth transistor having a control terminal coupled to an output of the differential amplifier, the fourth transistor configured to control the third transistor based on a control signal from the differential amplifier.

14. The electronic circuit of claim 13 wherein the first current source includes a switch coupled to one of the first and second transistors, the switch configured to select between the first and second operating modes.

15. The electronic circuit of claim 13, wherein the second current source is configured to be active in the first operating mode.

16. The electronic circuit of claim 13 wherein said second current source includes a fifth transistor coupled with the first transistor and the second power supply terminal.

17. The electronic circuit of claim 16 wherein said second current source has a control terminal coupled to the output of the differential amplifier.

* * * * *